J. W. McGOWAN.
BAKING MACHINE.
APPLICATION FILED MAR. 26, 1918.

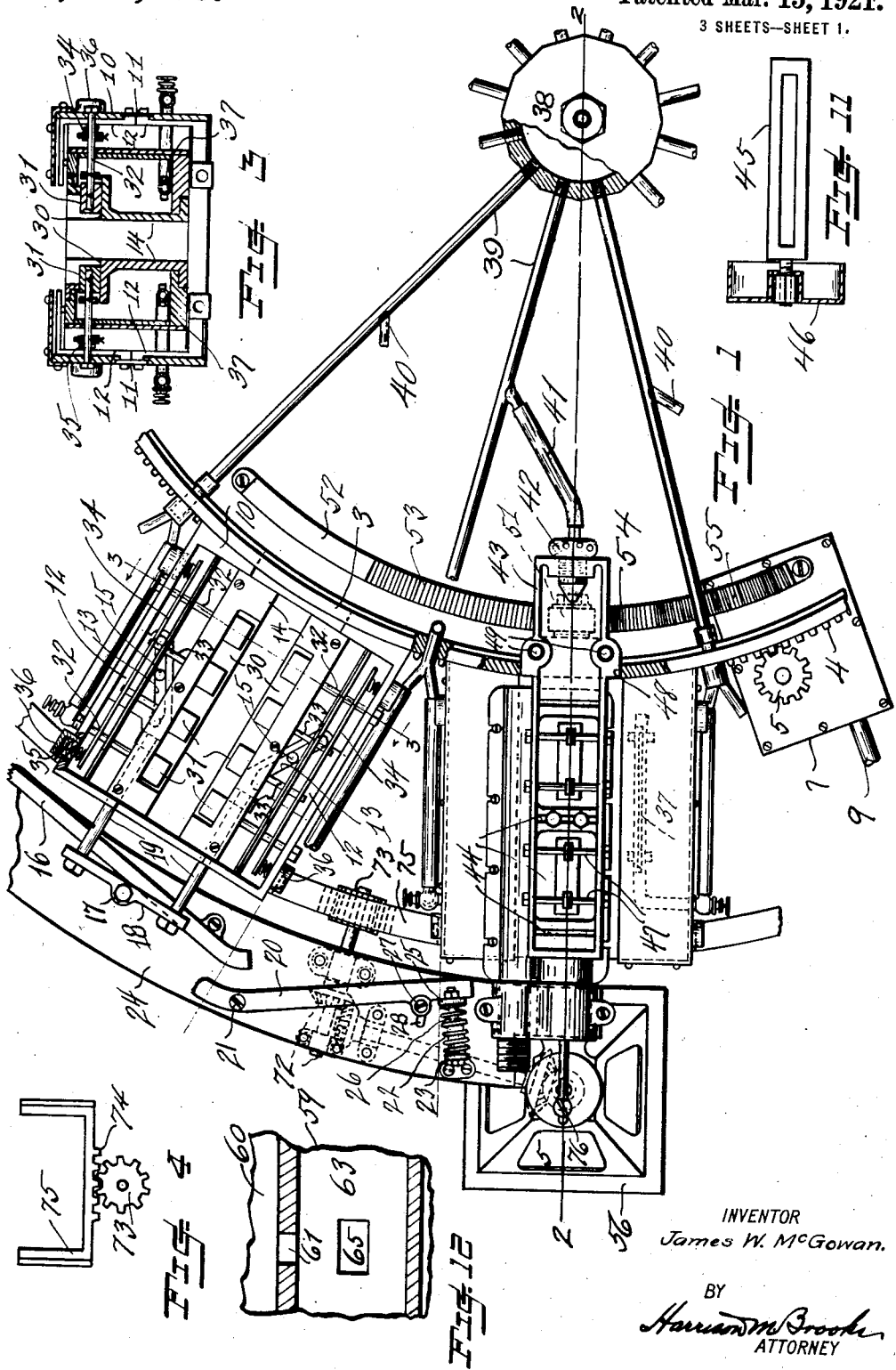

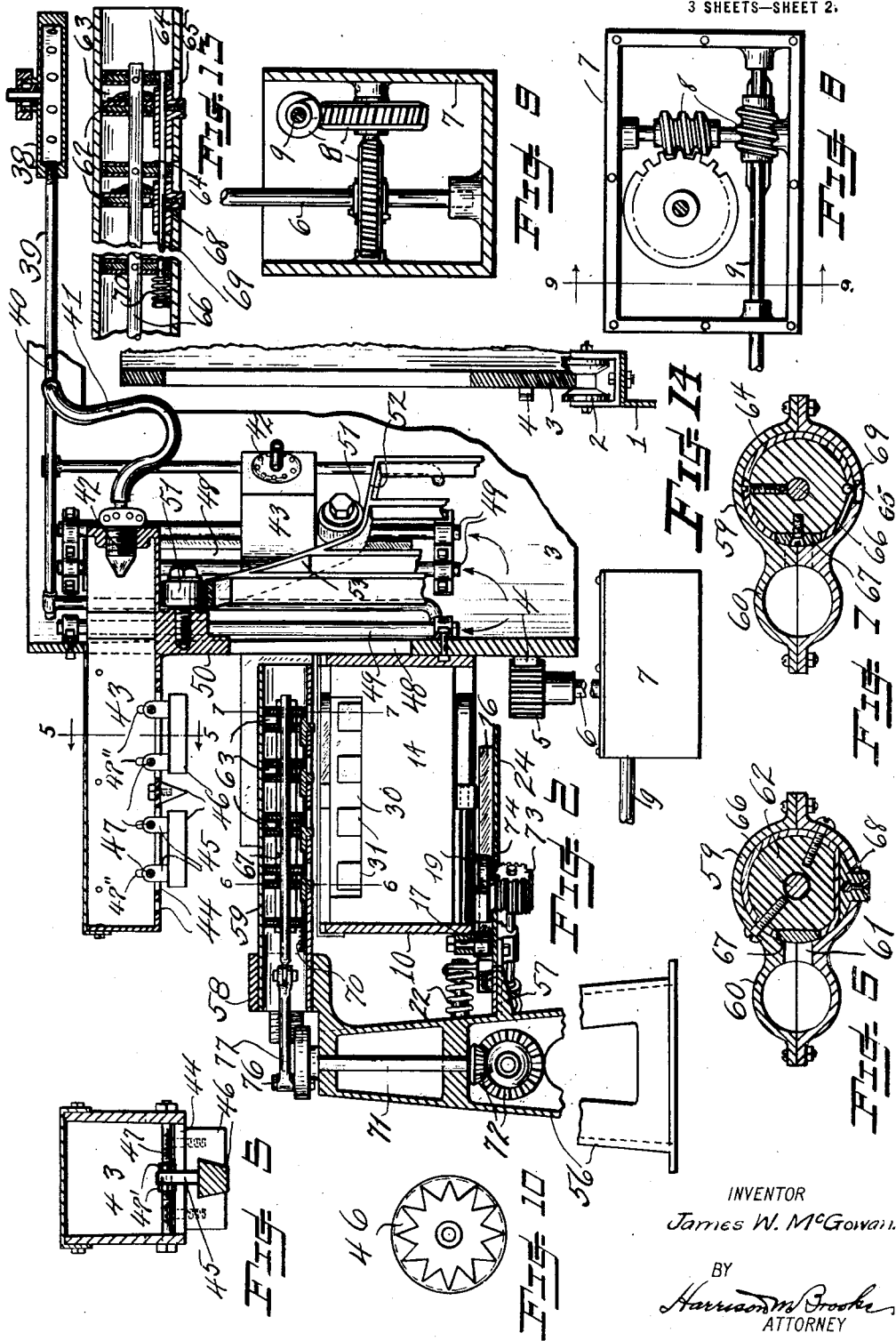

1,371,386.

Patented Mar. 15, 1921.
3 SHEETS—SHEET 3.

Inventor
James W. McGowan

By Harrison M. Brooks
Attorney

UNITED STATES PATENT OFFICE.

JAMES W. McGOWAN, OF SEATTLE, WASHINGTON.

BAKING-MACHINE.

1,371,386.  Specification of Letters Patent.  Patented Mar. 15, 1921.

Application filed March 26, 1918. Serial No. 224,756.

*To all whom it may concern:*

Be it known that I, JAMES W. McGOWAN, a citizen of the United States, residing at Seattle, in the county of King and State of Washington, have invented certain new and useful Improvements in Baking-Machines, of which the following is a specification.

The present invention, pertaining to certain new and useful improvements in baking machines, has for its primary object to provide novel mechanisms for feeding the batter or dough to gas-heated molds from which the baked products are discharged between the separable sections of the molds, provision being made to relieve the machine from strain that would be hurtful and injurious to the successful operation thereof and which strain would result in the forceful and positive closing of the separated mold section when any of the baked products or other articles shall have accidentally lodged between said separated sections.

Further, the invention resides in an improved automatic machine, and also the features of construction, and the arrangements and combinations of parts hereinafter described in detail and claimed in a succinct manner, reference being had to the accompanying drawings wherein—

Figure 1 shows the improved baking machine in fragmentary top plan view with portions broken away and removed;

Fig. 2 is a vertical section radial of the machine, a portion having been removed, on line 2—2 of Fig. 1;

Fig. 3 is a transverse section of a mold taken on line 3—3 of Fig. 1;

Fig. 4 is a detail view of the rack and pinion drive for the batter feeding mechanism;

Fig. 5 is a transverse section on line 5—5 of Fig. 2 through the core carrying member;

Figure 15:
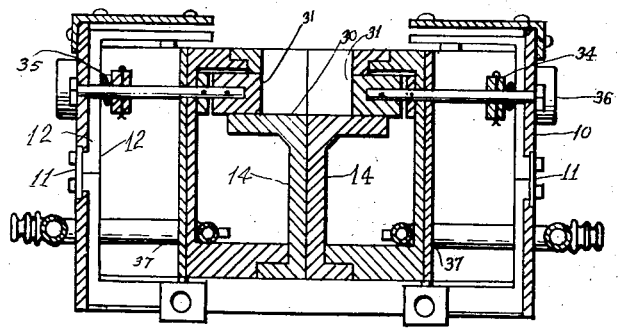

Figs. 6 and 7 are transverse vertical sections through the batter feeding mechanism, taken respectively on lines 6—6 and 7—7 of Fig. 2;

Fig. 8 is a top plan view of the transmission gearing employed as a suitable drive for the machine;

Fig. 9 is transverse section on line 9—9 of Fig. 8;

Fig. 10 is a bottom plan view of a pattern mold adapted to be carried by the core carrying member;

Fig. 11 is a sectional view thereof illustrating the means for connecting the pattern mold or core to said member;

Figs. 12 and 13 are detail illustrations further elucidating the construction of the batter feeding mechanism;

Fig. 14 shows the preferred manner of supporting the carrier;

Fig. 15 is a sectional view similar to Fig. 3 but showing the mold closed; and

Figure 16:
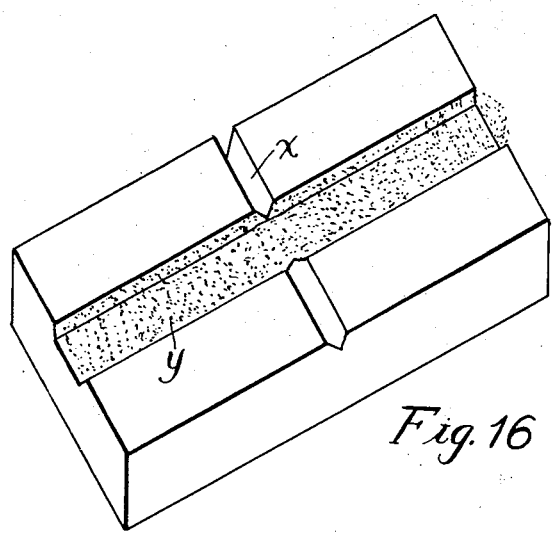

Fig. 16 is a perspective view of the cake product.

Referring more in detail to the accompanying drawings wherein corresponding parts are indicated by like characters of reference, the numeral 1 designates the supporting frame structure having arranged thereon a circular series of flanged rollers or bearings 2 to guidingly support the upright cylindrical carrier 3 which is adapted to be rotated through the instrumentality of a peripheral rack 4 and a meshing pinion 5. This pinion is carried on the upper end of a vertical shaft 6 that is suitably journaled in a gear casing 7 and connected through transmission gearing 8, within the casing, to a power shaft 9, the source of power not having been shown.

Bolted, or otherwise fastened, to the exterior surface of the rotatable cylinder or carrier is a peripheral series of rectangular, box-like frames 10 having horizontal guide slots in their radially extending sides in which the slides 11 operate. A pair of L-shaped cam members 12 have their vertical arms secured to the slides so as to extend in opposite directions therefrom and their horizontal arms extend inwardly in relatively superposed and opposing relation. In each box-like frame 10, and between the opposing horizontal arms of the cam members, is a pair of mold sections 14 which are separable and closable through a lateral sliding movement imparted by means of the pins 15 which extend from the sections and operate in the inclined cam slots 13 of the cam members. Consequently, as the cam members 12 are slid longitudinally of the frame 10, the mold sections will be accorded a transverse movement, opening or closing dependent upon the direction in which the cam members are moved.

Sliding movement is given the cam members by a pair of cam tracks which are disposed outwardly of the annular path of travel of the mold frames 10 for engagement by a roller 17, the latter being carried on the underside of cross head 18 which connects the outer ends of a pair of rods 19 having sliding bearing in the outer end walls of said mold frame. The inner ends of the rods have connection with the cam members 12, as depicted in Fig. 2.

As the roller 17 passes the fixed cam track 16 the mold sections are opened or separated for discharge of the molded and baked products. The cam track 20 inclines oppositely from track 16 and is designed to be engaged by the roller 17 almost immediately after it leaves the latter track. In view of the fact that a molded product might lodge between the separated mold sections, as the products are discharged therebetween, and thus resist the closing action of the mold, I have mounted the closing cam track in a pivotal and yieldable manner to prevent a positive and forceful closing movement of the sections. This novel mounting is shown in Fig. 1 and consists in pivoting the track 20 at its forward end, as at 21, and cushioning the rear end by a coiled spring 22 that is interposed between a fixed bracket 23, on the support 24, and the bracket 25 carried by said cam track 20. The spring is guided by a bolt or rod 26, while a screw clamp 27, carried by the track 20 and operating in an arcuate slot 28 in support 24, serves as a guide for the track as well as a means by which the track may be fixed stationary, when such a mounting is desired.

Although the molds may be of any desired shape, such as for the molding of cones, crackers, etc., I have shown in my preferred form of the invention a cracker or biscuit forming mold and for this reason the upper surface of the mold sections is recessed to form a pan, as at 30. The sides of this pan-shaped recess are apertured and these apertures are normally filled by the slidable ejectors 31 which have stems 32 extending through the sides of the frame 10 and headed to limit the inward projection of said ejectors. The intermediate ejectors have their stems 33 shortened and connected together and to the stems 32 by a bar 34 which is cushioned at each end by a spring 35, said springs fitting in sockets 36 that are screw threaded in the sides of the mold frame for removal. This mounting affords a resilient and yieldable backing for the ejectors which readily yields should one of the baked products stick to the pan. As the mold sections continue to separate the springs will become more tensioned and through this increasing pressure against the product, the ejectors will gradually loosen the latter and free it for discharge between the separating sections of the mold.

The baking heat is derived from gas burners 37, one being arranged in each hollow mold section 14 the heating chamber of which is sufficiently large to permit the fixed mounting of said burner relative to the box-like frame. The fuel gas is led into a manifold 38, located at the center of the carrier 3 and from which conducting pipes 39 radiate to the different mold frames, branching at their outer ends for connection with a pair of burners, as is illustrated in Fig. 1. Intermediate their lengths the pipes 39 have nipples 40 for connection with a flexible hosing 41 which is attached to a burner 42 mounted in the inner end of the box-like core-carrier 43.

The burner 42 is so positioned as to direct its flame longitudinally of the carrier, the heat passing outwardly in a downward direction through the various slots 44, through which latter the suspending shanks 45 of the core elements 46 extend. Different shaped core elements may be employed, those shown in Fig. 2 being designed as cutters arranged so as to divide the batter and baked products into four rectangular products, while that depicted in Figs. 10 and 11 is of an ornamental nature and is intended to impress the configuration in the product. As is clear from Figs. 1 and 5, the slotted shanks 45 are adjustable horizontally in a crosswise direction on the transverse hangers 47 by opposing nuts 47' engaged on the latter. The hangers 47 are vertically adjustable in slots 47'' in the side walls of the carrier casing.

The core carriers are each mounted in the vertical slots 48 in the cylinder 3 for sliding movement, being guided by the pair of guide rods 49 that pass through the bearings formed in the opposite sides of the carrier. The bearings are formed in an enlargement about the carrier intermediate its length, which enlargement also provides a depending bracket 50 on which is rotatably secured a roller 51. Fixed upon a stationary support alongside the inner periphery of the cylindrical carrier is a cam track that is traversed by the rollers 51 and comprises an initial, slight raise track section, 52, a completing raise section 53, an elevated section 54 and a lowering section 55. The disposition of the rollers 51 beneath the core-carriers and intermediate their lengths affords an easy lifting action without any binding on the guide rods 49.

In radial alinement with the elevated track section 54 is disposed the batter feeding mechanism, the same being mounted on a standard 56 which also has a ledge 57 to lend support to the support 24. In a sleeve-like bracket 58 at the top of the standard 56 is mounted a casing 59 and formed integral with this casing and extending alongside thereof is a feed manifold 60 which has communication at intervals with the casing through the intake ports 61. A plurality of fixed partitions 62 divides the casing into measuring compartments 63 in which slide the plungers 64 for expelling or ejecting the batter through the outlets 65. These plungers are connected to a single operating rod 66 that has slidable bearing diametrically through the partitions 62. Also connecting the plungers or ejectors 64 at their peripheries is a slide valve 67 having openings registrable with the inlets 61, and controlling the size of the discharge of batter through each outlet 65 is a valve 68 which opposes the respective plunger and has a part depending through the outlet, as shown in Fig. 13. The valves 68 are adjustable lengthwise on a rod 69 for controlling the size of the outlet, said rod 69 carrying a coiled spring 70 at one end for yieldably bearing against the adjacent plunger 64.

In actual operation, as the molds approach the batter feeding device, the sections 14 are separated and closed for discharging the baked products and the core-carrying member is elevated to a plane above the batter feeder so that on continued movement of the carrier 3 the mold will pass beneath the discharge openings 65 and the core carrier above the feeder.

Arranged to operate the feeder synchronously with the passage of the molds therebeneath is a gearing including a vertical shaft 71 that is rotated through the transmission gears 72 and a pinion 73 which latter is adapted to mesh with a rack 74. This rack is provided on the lower side of a U-shaped bracket 75 conveniently employed to connect and brace the outer ends of the mold frames. Fixed on the upper end of the vertical shaft 71 is a disk having an eccentrically located pin 76 to which the plunger actuating rod 66 is connected for operating in the manner of a pitman. Consequently, through the spaced racks 74, the plungers are intermittently actuated to first suck or draw in a charge of batter through the inlet openings 61 and then eject the charge through the outlet openings 65 into the mold as it passes therebeneath.

Obviously, the batter feeding device is geared to operate in timed relation with the movement or positioning of the molds therebeneath and the opening of the valves 68 whereby the batter will be properly discharged.

What is claimed is—

1. A baking machine comprising a cylindrical frame rotatable about a vertical axis and formed with a series of longitudinal slots, radially disposed core carriers of box-like form extending through the slots so as to project radially inwardly and outwardly of the cylinder, means guidingly supporting the carriers in the slots, core elements supported by the carriers exteriorly of the cylinder, and a burner mounted in the inner end of each carrier to direct its flame longitudinally thereof.

2. In a baking machine, a rotatable, cylindrical carrier disposed on end and formed with a peripheral series of vertical slots, core carriers slidable in the slots and provided with depending brackets intermediate their lengths, rollers carried by the brackets, a fixed cam track arranged within the cylindrical carrier adjacent its inner periphery for engagement by the rollers to effect a lifting of the core carriers, and an underlying mold for each core carrier also supported by the carrier first mentioned.

3. A baking machine including a core carrier of hollow formation having one side formed with a plurality of slots extending longitudinally thereof, and core elements having shanks extending through the slots and adjustably secured interiorly of the carrier.

4. A baking machine comprising a substantially cylindrical frame having its axis vertical and formed with lengthwise slots, guide rods located on opposite sides of each slot, a mold element extending radially through each slot and provided with a supporting bracket positioned intermediate the ends of said mold element and slidably engaged in the slot and embracing the guide rods, a roller journaled on the bracket underlying the mold element, and a track over which the roller rides for raising and lowering the mold element.

5. In a baking machine, a movable carrier, a mold carried thereby and including separable sections, single means carried by the mold for positively moving each section toward and from the companion section, a fixed cam arranged in the path of travel of said means for effecting separation of the mold sections, and a second cam also arranged in the path of travel of said means for effecting a closing together of the mold sections, said second cam means being pivoted at one end and resiliently cushioned at its other end.

6. In a baking machine, a movable carrier, a mold carried thereby and including separable sections, single means carried by the mold for positively moving each section toward and from the companion, a support extending alongside the path of travel of the mold, a cam fixed thereon to engage said means for pulling it outwardly and thus separate the mold sections, and a second outwardly yieldable cam extending inwardly across the outwardly inclined path of travel imparted to said means by the first cam for engaging said means and move it inwardly to thereby close the mold sections.

7. In a baking machine, a movable carrier, a mold carried thereby and including separable sections, single means carried by the mold for positively moving each section toward and from the companion, a support extending alongside the path of travel of the mold, a cam fixed on the support to engage said means for pulling it outwardly for separating the mold sections, and a second cam extending inwardly across the outwardly inclined path of travel imparted to said means by the first cam to effect a closing of the mold sections, said second cam being pivoted at its forward end to the support and slidably connected thereto at its rearward end, and a spring cushioning the slidable end against outward movement.

In testimony whereof I affix my signature.

JAMES W. McGOWAN.